United States Patent
Rouhier et al.

(10) Patent No.: US 7,860,679 B2
(45) Date of Patent: Dec. 28, 2010

(54) METHOD OF TESTING AND INSTALLING A HOME AUTOMATION REMOTE CONTROL UNIT

(75) Inventors: Valérie Rouhier, Thyez (FR); Jean-Michel Orsat, Chatillon-sur-Cluses (FR); Florent Pellarin, Saint-Martin Bellevue (FR)

(73) Assignee: Somfy SAS, Cluses (FR)

(*) Notice: Subject to any disclaimer, the term of this patent is extended or adjusted under 35 U.S.C. 154(b) by 722 days.

(21) Appl. No.: 11/787,867

(22) Filed: Apr. 18, 2007

(65) Prior Publication Data

US 2007/0260331 A1    Nov. 8, 2007

(30) Foreign Application Priority Data

Apr. 19, 2006   (FR)   .................. 06 03447

(51) Int. Cl.
*H04N 5/44*   (2006.01)
(52) U.S. Cl. .................. 702/108; 340/825.22; 348/734
(58) Field of Classification Search .................. 702/108, 702/122, 123; 340/7.55, 7.56, 825.22, 825.24, 340/7.1, 7.2, 7.24; 703/23, 27; 348/734
See application file for complete search history.

(56) References Cited

U.S. PATENT DOCUMENTS

| | | | |
|---|---|---|---|
| 6,437,836 B1 | 8/2002 | Huang et al. | |
| 6,791,467 B1 * | 9/2004 | Ben-Ze'ev | 340/825.69 |
| 6,904,380 B1 * | 6/2005 | Brayton et al. | 702/108 |
| 6,937,972 B1 | 8/2005 | Van Ee | |
| 7,102,502 B2 | 9/2006 | Autret | |
| 2003/0151538 A1 | 8/2003 | Escobosa et al. | |
| 2005/0083224 A1 | 4/2005 | Autret | |
| 2005/0088275 A1 | 4/2005 | Valoteau et al. | |
| 2006/0161865 A1 * | 7/2006 | Scott et al. | 715/810 |

FOREIGN PATENT DOCUMENTS

| | | |
|---|---|---|
| WO | WO 00/39772 | 7/2000 |
| WO | WO 02/07122 | 1/2002 |
| WO | WO 03/049375 | 6/2003 |
| WO | WO 03/069573 | 8/2003 |
| WO | WO 03/069794 | 8/2003 |

* cited by examiner

*Primary Examiner*—Manuel L Barbee
(74) *Attorney, Agent, or Firm*—Frommer Lawrence & Haug LLP; Ronald R Santucci

(57) ABSTRACT

A method of testing and installing a remote control unit (RCU) for controlling elements (ACT1, ACT2, ACT3) of a home automation network, intended for managing the security or heat or light comfort in a building, comprising the use of software (ALS) emulating the remote control unit in a computer (PCU) to define a virtual remote control unit (VRCU), and the configuring of the virtual remote control unit to enable the elements of the network to be controlled, wherein sending rights are assigned to the virtual remote control unit at the time of that configuration and wherein the cancellation of these sending rights results at least from a step for copying the configuration (CFG) of the virtual remote control unit in the remote control unit.

10 Claims, 2 Drawing Sheets

METHOD OF TESTING AND INSTALLING A HOME AUTOMATION REMOTE CONTROL UNIT

This application claims priority benefits from French Patent Application No. 06 03447 filed Apr. 19, 2006, the disclosure of which is hereby incorporated by reference.

BACKGROUND OF THE INVENTION

The invention relates to a method of testing and installing a remote control unit for controlling elements of a home automation network intended for managing security or heat or light comfort in a building. It also relates to a data medium comprising software for implementing such a method.

In home automation installations, it is normal for a set of remote control units to use radiofrequency communication to transmit control commands to actuators or receive status information from actuators in a building.

Such actuators are intended to, for example, move mobile closing equipment, such as doors, gates, roller blinds, locks, solar protection, such as blinds or filtering screens, move ventilation equipment such as cooling flaps, or move multimedia projection equipment (projection screens). The actuators can also act on heating, air conditioning, ventilation or lighting devices.

The actuators and remote control units also communicate by radiofrequencies with sensors measuring physical quantities such as temperature, humidity, wind speed, lighting, luminance, etc., likely to affect the comfort or energy consumption of the building.

The radiofrequency communication of most of the elements (actuators, sensors, remote control units) of the installation is two-way, but some elements communicate only one-way.

All the elements of the installation have a common identification means which enables them to know that they belong to one and the same installation, and disregard radiofrequency signals that are not intended for them. This identification means is, for example, a "house key" which comprises a seed duplicated in a computation algorithm used during authentication processes.

The elements of the installation also contain in memory the list of the elements that they control, or, conversely, the list of the elements that they obey to, or even the list of the elements from which they receive measurement information.

Introducing a new remote control unit into the installation means making said unit known to all the equipment it will control and/or conversely acquiring a list of the latter. This configuration operation can be more or less tedious to carry out.

DESCRIPTION OF THE PRIOR ART

Patent applications WO 03/069794, WO 03/069573, WO 03/049375 and WO 03/107105 describe several additional means for simplifying the configuration operations.

In the latter application, a PC computer type tool is used by the installer for example to serve as an intermediary in the transmission of data between remote control units and actuators, or, conversely, between actuators and remote control units, and to facilitate the setting up of links between such data.

In U.S. Pat. No. 6,791,467, a universal remote control unit is able to communicate with, and give control commands to, all the household appliances located within radio range. The appliances, via an additional equipment unit, supply the universal remote control unit with the data necessary for control. The screen of the universal remote control unit is able to represent a virtual control panel of the appliance.

Also known from application WO 00/39772 is a method of configuring and testing a remote control unit in which the remote control unit is emulated on a computer. The duly obtained virtual remote control unit can control various appliances and the configurations set up on the virtual remote control unit can be downloaded to a similar, real remote control unit. This application is a counterpart application of U.S. Pat. No. 6,937,972. The content of this patent is incorporated by reference to the instant application.

SUMMARY OF THE INVENTION

The invention can be applied to a small commercial building, having a certain complexity, but it is mainly intended to facilitate the purchase and installation of a new type of remote control unit in an existing home installation, for example a home already containing a number of actuators, remote control units and/or sensors of the type described.

In practice, with the technical offerings of remote control unit manufacturers evolving, new models have a user interface or new functionalities that are not known to the user. Furthermore, several manufacturers that use the same communication protocol offer remote control unit models that have different appearances and interfaces to control the same appliances with more or less sophisticated functionalities.

It is in the user's interest to be able to compare several remote control unit models before making his choice. However, this comparison step may take at least a week, even far longer, if the control has weekly or seasonal functionalities.

To make this comparison possible, the remote control unit distributor has to loan the user a remote control unit or even several remote control units for several days, weeks or months. This imposes considerable logistical constraints, particularly when remote control units have to be loaned simultaneously to different users.

The aim of the invention is to provide a method of testing and installing a remote control unit that overcomes the drawbacks identified above and that improves the test methods known from the prior art. In particular, the invention makes it possible to overcome a certain number of logistical constraints linked to the loaning of remote control units to users for relatively long periods. The invention also makes it possible to compare the performance or the reaction of two remote control units in almost identical contexts. The invention also makes it possible to facilitate the installation of a new remote control unit in an existing home automation installation. The invention also relates to a remote control unit for implementing such a method.

The inventive method is defined by claim 1.

Various embodiments of this method are defined by dependent claims 2 to 8.

An inventive data medium is defined by claim 9.

An inventive remote control unit is defined by claim 10.

DESCRIPTION OF THE DRAWINGS

The appended drawings show, by way of example, an embodiment of an installation for implementing an embodiment of the inventive method.

DESCRIPTION OF THE PREFERRED EMBODIMENTS

Figure 1:
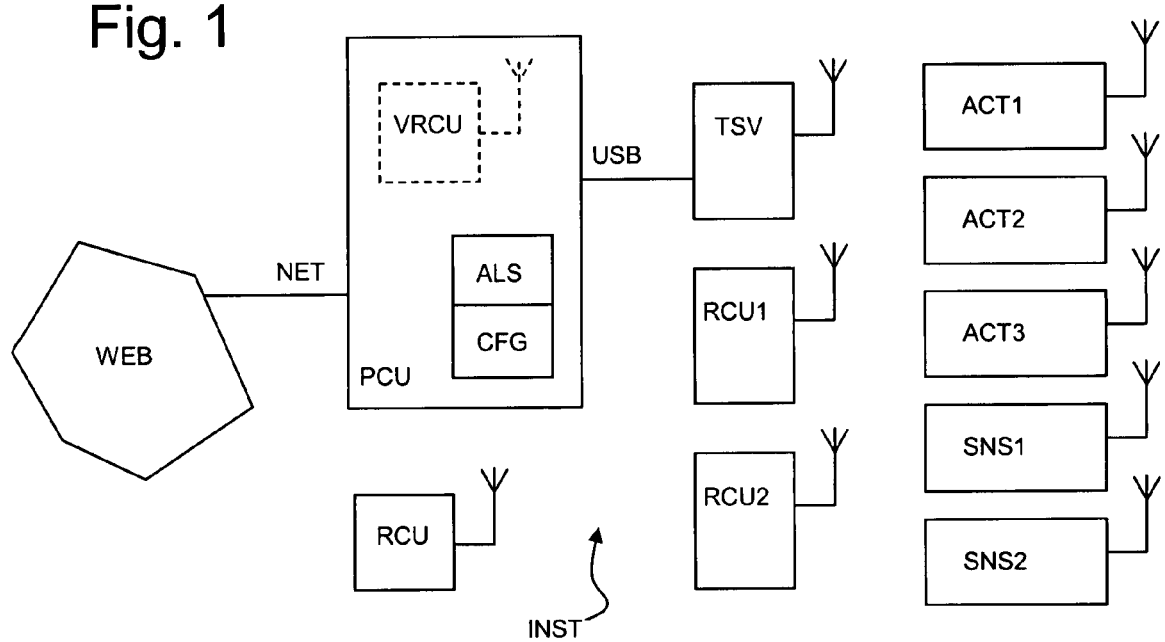
FIG. 1 is a diagram of a home automation installation for implementing an embodiment of the inventive method.

The installation INST represented in FIG. 1 comprises a computer PCU, for example of PC type, provided with input means such as, in particular, a keyboard and a mouse and a display screen (not shown).

This computer is connected to the Internet network WEB by a network link NET. Alternatively, the reference NET can represent a link to a data drive, for example, an optical disk drive DVD, and the WEB reference can represent the data drive.

The computer is also connected to a bidirectional radio transmitter TSV, represented by a rectangular block, and to an antenna, via a peripheral link, for example a wired link of USB type. Alternatively, the transmitter TSV can be incorporated in the computer in a standard version, or even in a specific computer version used as a dedicated tool.

The bidirectional radio transmitter TSV can communicate by radiofrequencies using a common protocol with multiple actuators ACT1, ACT2, ACT3 controlling the home automation appliances installed in the building.

Each actuator is represented by a rectangular block provided with an antenna to diagrammatically represent the means required for the radiofrequency link. All the elements therefore communicate by one and the same physical carrier and by one and the same protocol defining one and the same home automation network provided that the same authentication key is shared by all the elements.

The first actuator ACT1 comprises a gear motor, the output shaft of which drives the movement of a gate. The second actuator ACT2 acts on a heating/air conditioning means. The third actuator ACT3 acts on a lighting means. In each case, the actuator comprises all the means needed to receive a message containing a control command, to interpret the command and to execute it. The actuator also comprises the means needed to generate messages relating to its state (or the state of the appliance associated with the actuator) and to send such messages in the home automation network.

None of these means, or the actuator power supply means, are shown because they are known to those skilled in the art and do not affect the implementation of the invention.

The installation INST also comprises a sensor SNS1 of meteorological type giving information on the conditions outside the building (for example, wind speed, temperature, sunlight, perimeter approach detection, etc.) and a sensor SNS2 giving information on the conditions inside the building (temperature, lighting, presence detection, etc.).

These sensors also comprise communication means enabling them to communicate with the rest of the home automation network.

The installation INST also comprises a remote control unit RCU1 and a remote control unit RCU2, which also comprise communication means enabling them to communicate with the rest of the home automation network.

A new remote control unit RCU is intended to be incorporated in the home automation network. The method of installing the latter in the home automation network is described further on.

Figure 2:
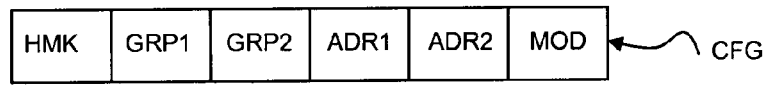
FIG. 2 is a diagram representing the configuration information of a new remote control unit inserted into the installation.

At the end of the installation process, the new remote control unit contains a series of configuration data CFG represented in FIG. 2. This series comprises in particular:
- a digital value of a house key HMK, shared by all the elements of the installation,
- a first group identifier GRP1, relating to a first group of elements simultaneously controlled by this remote control unit for a first type of command,
- a second group identifier GRP2, relating to a second group of elements simultaneously controlled by this remote control unit for a second type of command,
- an address code ADR1 of a first sensor that can be interrogated by the remote control unit on activation of a third type of command,
- the address code ADR2 of a second sensor that can be interrogated by the remote control unit on activation of a fourth type of command,
- a digital mode sequence MOD comprising information relating to the parameterizing of the remote control unit itself by the user: for example, choice of assignment of certain keys to certain functions or to a particular type of command, sensitivity of a key to pressing, type of display, cursor speed, language used in dialogs, hourly, daily, weekly, seasonal parameters, etc.

Alternatively, the group identifiers can be replaced by the list of the individual identifiers (or addresses) of all the elements that make up each group.

Conversely, once the installation of the new remote control unit is finished, all the actuators likely to obey specific commands originating from this new remote control unit have stored in memory an identifier relating to this remote control unit in order to be able to recognize it. Thus, the security of the installation is assured by the presence of a house key HMK in the remote control unit and/or by the storing of an identifier of the remote control unit in all the actuators obeying the remote control unit, so creating authentication links between remote control unit and actuators.

All these installation and configuration operations can be carried out with the methods described in the documents of the prior art.

Figure 3:
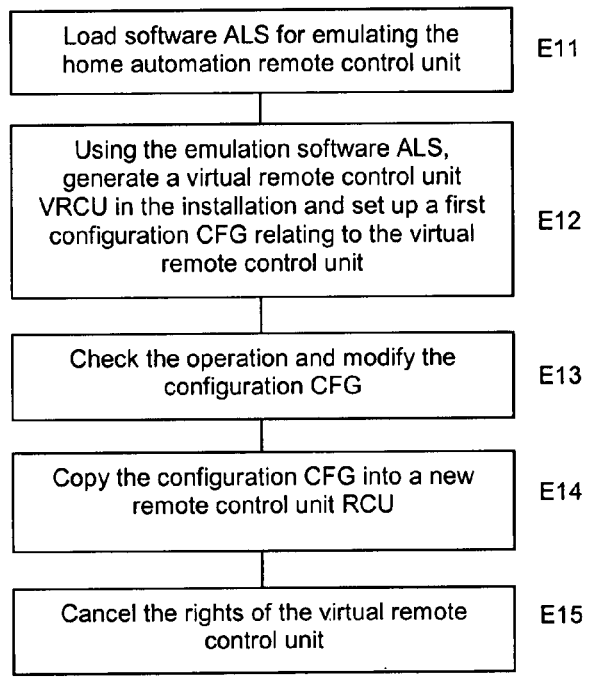
FIG. 3 is a flow diagram of an embodiment of an inventive method of testing and installing a new remote control unit.

A method of testing a new remote control unit in an existing home automation installation is described with reference to FIG. 3.

In a first step E11, the user installs, in his home, on his personal computer PCU, software emulating a home automation remote control unit that he has planned to test with a view to purchasing it. Installation of the software can be done using a disk supporting digital data containing the emulation software that has been handed over to the user by the remote control unit distributor, or by downloading the emulation software via the Internet network.

The emulation software ALS comprises a set of executable programs needed to functionally simulate a real home automation remote control unit and, preferably, display the emulated remote control unit whose keys can be activated using the input interface of the computer, for example via the keyboard, the mouse or a touch screen.

The emulation software ALS thus comprises software means for activating the bidirectional transmitter TSV according to the commands to be transmitted, software means for displaying the image of the emulated remote control unit, the messages that the screen of the home automation control unit would display when it is operated or when messages are received by the bidirectional transmitter TSV.

The emulation software can be similar to that used in U.S. Pat. No. 6,791,467, the content of which is incorporated with reference to the present application.

In a second step E12, the user uses his computer to perform all the configuration operations of the emulated remote control unit or virtual remote control unit, as he would have done with a new real home automation remote control unit.

Pictorially, the virtual remote control unit VRCU is represented in the form of a dotted-line block within the computer PCU.

At the end of the second step E12, all of the configuration CFG is therefore stored in the memory of the computer, as shown in FIG. 1.

Once the virtual remote control unit is configured, the user can control the various elements of the installation with the latter and use it to check for himself the benefits of certain new functionalities offered by the new remote control unit that he is considering buying. In particular, the user will have created all the authentication links between the virtual remote control unit and the elements of the installation and rights to send commands are thus assigned to the virtual remote control unit.

In a third step E13, the user checks the operation of the virtual remote control unit and, if necessary, modifies its configuration so that the latter best responds to his needs and expectations.

The period of use of the virtual remote control unit can be limited. To do this, the duration of the period for which the use of the remote control unit emulation software is possible is limited. This period can, for example, be one month. At the end of this period, the rights to send commands from the virtual remote control unit are cancelled. During this period, the virtual remote control unit will have allowed the user to form an opinion on the remote control unit that he is considering buying. In practice, during this period, apart from the fact that the user must act on the virtual remote control unit through his computer, the virtual remote control unit operates exactly as the real remote control unit would, particularly in using the information obtained from the sensors to generate commands according to the installation configuration carried out by the user.

The virtual remote control unit can also be used to save one or more operating scenarios, saving a scenario entailing saving data in the virtual remote control unit and/or in the actuators involved in the scenario.

When the rights are cancelled at the end of a predetermined period, a prior message is preferably sent by the virtual remote control unit so as to order the deletion of the data saved in the actuators or sensors of the installation during the phase of use of the virtual remote control unit.

In a fourth step E14, the user who has purchased the real remote control unit RCU brings the latter within range of the other elements of the installation. This new remote control unit RCU is then integrated into the installation very easily. In practice, the configuration CFG of the virtual remote control unit can be copied from the memory of the computer to the new remote control unit RCU. The configuration CFG is transmitted, by radiofrequencies, using the transmitter TSV of the computer. As described below, this transmission is, for example, automatic, and occurs as soon as the computer detects, within the radio range area of the transmitter TSV, a remote control unit that is not yet programmed of the same type as that emulated in the computer. Immediately the configuration is copied from the virtual remote control unit into the real remote control unit, the rights to send commands from the virtual remote control unit can be cancelled.

In a fifth step E15, the rights to send orders from the virtual remote control unit via the transmitter TSV are cancelled, so as to avoid conflicts between virtual and real remote control units of the same type having the same settings. The emulation software ALS and the configuration CFG are nevertheless retained in the memory of the computer so that they can, if necessary, be reused to configure another new remote control unit, for example if there are problems with the first one.

The way the method is executed embodies a number of variants. In particular, the steps E11 to E13 can be duplicated: several emulation software packages are then loaded and run so as to be able to test several remote control unit models simultaneously.

Figure 4:
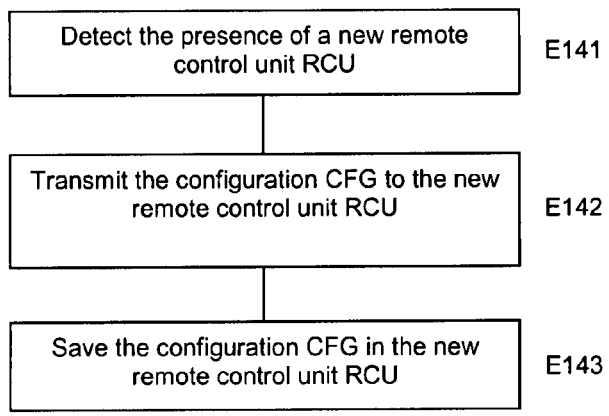
FIG. 4 is a flow diagram of a first variant of execution of the step E14 of FIG. 3.

FIG. 4 shows a first variant of the fourth step E14 involving copying the configuration. In a first substep E141, the presence of a new remote control unit RCU, not yet known to the virtual remote control unit, is detected by the bidirectional transmitter TSV. This detection is, for example, automatic as soon as the new remote control unit is within radio range, and pressing on one of the keys of this new remote control unit provokes a transmission. Alternatively, pressing a particular sequence of keys provokes this detection. In a second substep E142, the configuration CFG is transmitted to the new remote control unit RCU by radio using the bidirectional transmitter TSV. This transmission is automatically initiated by the preceding step. Alternatively, it results from an action on the part of the user on the virtual remote control unit. Finally, in a third substep E143, the configuration data received is saved in the new remote control unit RCU.

Figure 5:
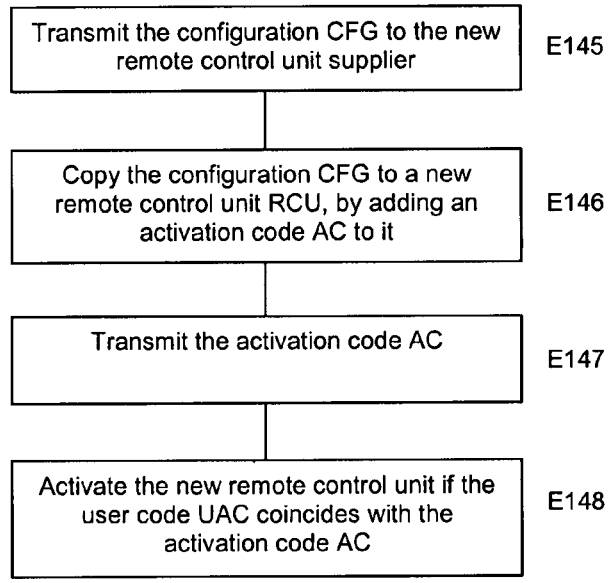
FIG. 5 is a flow diagram of a second variant of execution of the step E14 of FIG. 3.

FIG. 5 shows a second variant of the fourth step E14 involving copying the configuration. In a first substep E145, the configuration CFG is transmitted by the user (or by the installer) to the supplier of new remote control units, for example their manufacturer or their dealer, from the computer PCU. This transmission takes place securely if it uses the Internet network WEB.

Figure 6:
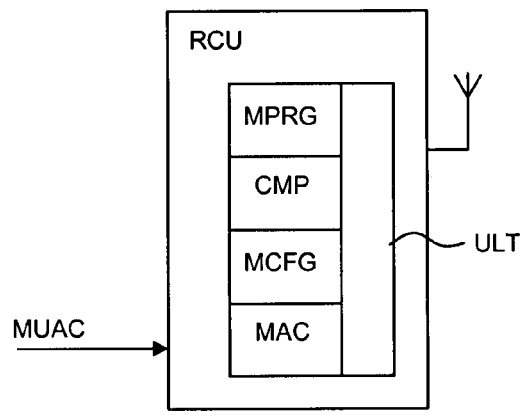
FIG. 6 is a detail diagram of an inventive remote control unit.

In a second substep E146, the supplier copies the configuration CFG into a new remote control unit RCU, ordered by the user. In this substep, a saved activation code AC is also placed into memory in the new remote control unit RCU. In a third substep E147, the activation code is transmitted, independently of the new remote control unit, to the user by the supplier. The new remote control unit is sent separately to the user. In a fourth substep E148, the user inputs a user activation code UAC in the new remote control unit. If the activation code input coincides with the saved activation code, then the new remote control unit is activated and immediately behaves like the virtual remote control unit. The activation code is supplied by means of the keypad of the new remote control unit, by inserting a memory card if it has been transmitted in this form to the user, or by any other means (for example, an optical read). FIG. 6 describes a remote control unit RCU. It comprises a processing logic unit ULT comprising a memory MPRG for storing remote control unit operating programs, a configuration memory MCFG, a memory MAC for prestored activation code AC, a means of inputting the user activation code MUAC, and a means CMP of comparing codes and activating the remote control unit if the codes coincide.

The term "coincide" should not be understood to necessarily mean an exact match, but at least a correlation or complementarity. The algorithm used to create the activation code can generate two different codes, one for saving in the remote control unit by the supplier, the other to be communicated to the user. These two codes are complementary and recognized as such by the algorithm contained in the comparison means.

The memory MPRG contains the programs governing the operation of the remote control unit: they constitute software means for implementing the inventive method.

This variant is of interest if the user prefers a simple demonstration by an installer of the functionalities of the remote control unit that he is about to purchase, by leaving it to the installer to configure the installation with the virtual remote control unit, on a laptop computer of the installer and kept by the latter after the demonstration. The consequences of a loss or theft of the remote control unit RCU during the delivery phase are thus avoided.

The term "cancellation of sending rights" should be understood to mean that the virtual remote control unit is no longer able to control the various elements of the installation. This can, for example, be done by disabling the emulation program, by disabling the bidirectional transmitter, or by cancelling the house key HMK used to authenticate the virtual remote control unit as an element of the installation.

The rights can also be cancelled in two stages. Firstly, the virtual remote control unit can no longer control the various elements of the installation but can communicate with the new remote control unit. Secondly, the link with the new remote control unit is eliminated. The second stage is optional.

In all the variants, the step of cancellation of the rights to send commands from the virtual remote control unit results at least from the step copying the configuration. In practice, the cancellation of the rights to send commands can automatically result from one of the copying substeps.

For example, in a first variant, the cancellation of the rights can be provoked immediately the presence of the new remote control unit is detected by the bidirectional transmitter, but it is preferable to wait for the transfer of the configuration to be completed.

In a second variant, cancellation of the rights can take place immediately after the first substep for transferring the configuration to the supplier. The execution of this Internet transfer can, for example, remain impossible until the user has clicked on a button authorizing the cancellation of the rights. It can result from the substep for transmission to the user of the activation code, if this code is transmitted by Internet to the computer supporting the virtual remote control unit: immediately a message including the access code is received, the rights are automatically cancelled. It can also result from the substep involving recognition of the correct activation code by the new remote control unit, by automatic transmission of a specific control by this new remote control unit.

Finally, the cancellation of the rights can automatically result from a first send command operation from the new remote control unit: immediately the transmitter TSV detects a radiofrequency transmission comprising the same identifier as that of the virtual remote control unit, the emulation software causes the rights of the virtual remote control unit to be cancelled, even if the message is addressed to another element of the installation.

Once the communication rights of the virtual remote control units have been terminated, the computer PCU is no longer part of the home automation installation.

Software to assist in configuring the remote control units can be supplied to avoid the user having to reproduce all the operations needed to configure a real remote control unit. This assistance software can be contained on the disk supporting digital data containing the emulation software that was handed to the user by the remote control unit distributor, or be downloaded via the Internet network. Thus, in addition to an operating mode of the virtual remote control unit that is strictly identical to the real remote control unit, it is possible to benefit from the functionalities of the computer to facilitate certain programming operations. The assistance software comprises specific menus to facilitate the programming of scenarios, customizing of icons, etc.

Since the virtual remote control unit also makes it possible to save names in the actuators, in the sensors or in the other control units of the installation, this operation is facilitated by the assistance software and the use of the computer keyboard.

With this invention, major logistical problems involved in the loaning of remote control units can be resolved. In practice, by assuming that all the users have a computer, it is enough for the remote control unit distributors to supply a transmitter TSV to be connected to their computer and remote control unit emulation software.

The personal computer can be replaced by any consumer device having an ability to load and run programs, an appropriate man-machine interface, and the communication means described. Such a device can, for example, comprise a personal digital assistant or an advanced mobile telephone.

The communication links described previously between the remote control, the transmitter and the actuators use radio waves. However, some of these links may use other means and, particularly, infrared waves.

The invention claimed is:

1. A method of testing and installing a remote control unit (RCU) for controlling elements (ACT1, ACT2, ACT3) of a home automation network intended for managing security or heat or light comfort in a building, comprising the use of software (ALS) emulating the remote control unit in a computer (PCU) to define a virtual remote control unit (VRCU), and the configuring of the virtual remote control unit to enable the elements of the network to be controlled, wherein sending rights are assigned to the virtual remote control unit at the time of that configuration and wherein the cancellation of these sending rights results at least from a step of copying the configuration (CFG) of the virtual remote control unit in the remote control unit.

2. The method as claimed in claim 1, wherein the sending rights of the virtual remote control unit are also cancelled at the end of a predetermined time, counted when using the virtual remote control unit or from the installation of the emulation software.

3. The method as claimed in claim 1, wherein the phase for loading remote control unit emulation software into a computer is done via the Internet.

4. The method as claimed in claim 1, wherein the virtual remote control unit configuration phase comprises loading software into the computer to assist in configuring the virtual remote control unit and running this software.

5. The method as claimed in claim 1, wherein the step for copying the configuration of the virtual remote control unit to the remote control unit comprises a phase for transmitting configuration data over the Internet network.

6. The method as claimed in claim 1, wherein the step for copying the configuration of the virtual remote control unit to the remote control unit comprises a phase for transmitting data by radio or infrared waves.

7. The method as claimed in claim 1, wherein the step for copying the configuration of the virtual remote control unit to the remote control unit is accompanied by a phase for storing an activation code in the remote control unit.

8. The method as claimed in claim 1, wherein the step for copying the configuration of the virtual remote control unit to the remote control unit takes place automatically when the computer detects, within the range area of the transmitter (TSV), a remote control unit that is not yet programmed of the same type as that emulated in the computer.

9. A non-transitory computer readable medium containing computer instructions stored therein for causing a computer processor to perform the method as claimed in claim 1.

10. A remote control unit (RCU) for controlling elements (ACT1, ACT2, ACT3) of a home automation network intended for managing security or heat or light comfort in a building, which comprises a configuration memory (MCFG) and an activation code memory (MAC) the contents of which are prestored, a means of inputting a user activation code and a means (CMP) of activating the remote control unit if the user activation code matches the prestored activation code and hardware means (ULT) and software means (PRG) for executing the method as claimed in claim 1.

* * * * *